(12) United States Patent
Sato et al.

(10) Patent No.: US 9,086,605 B2
(45) Date of Patent: Jul. 21, 2015

(54) LIQUID CRYSTAL DISPLAY DEVICE

(71) Applicant: Japan Display Inc., Tokyo (JP)

(72) Inventors: Takao Sato, Chiba (JP); Saori Sugiyama, Chosei (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 13/645,673

(22) Filed: Oct. 5, 2012

(65) Prior Publication Data

US 2013/0120684 A1   May 16, 2013

(30) Foreign Application Priority Data

Oct. 5, 2011   (JP) ................. 2011-221255

(51) Int. Cl.
*G02F 1/1362* (2006.01)
*G02F 1/1343* (2006.01)

(52) U.S. Cl.
CPC .... *G02F 1/136204* (2013.01); *G02F 1/134363* (2013.01)

(58) Field of Classification Search
CPC ............... G02F 1/136204; G02F 2001/1555; G02F 2001/1557; G02F 2001/136268; G02F 2001/134318
USPC ........................................... 349/40
See application file for complete search history.

(56) References Cited

U.S. PATENT DOCUMENTS

| | | | |
|---|---|---|---|
| 2002/0085135 A1* | 7/2002 | Kim et al. | 349/40 |
| 2007/0153206 A1* | 7/2007 | Lim et al. | 349/141 |
| 2008/0002079 A1* | 1/2008 | Kimura | 349/42 |
| 2009/0185094 A1* | 7/2009 | Lee et al. | 349/46 |
| 2010/0201932 A1 | 8/2010 | Gotoh et al. | |
| 2010/0321599 A1* | 12/2010 | Hwang et al. | 349/40 |
| 2011/0090446 A1* | 4/2011 | Kim et al. | 349/139 |

FOREIGN PATENT DOCUMENTS

JP   2010-181785   8/2010

* cited by examiner

*Primary Examiner* — Dennis Y Kim
(74) *Attorney, Agent, or Firm* — Lowe Hauptman & Ham, LLP

(57) ABSTRACT

A liquid crystal display device includes a gate electrode formed on an upper surface of an insulating substrate, a gate insulating film laminated to cover the gate electrode, a drain electrode and a source electrode formed above the gate insulating film, a semiconductor layer laminated on an upper surface of the gate insulating film, and controlling a current between the source electrode and the drain electrode by an electric field developed by the gate electrode, a common electrode having an opening portion which is formed in a region corresponding to a channel region above the semiconductor layer, and an antistatic pattern arranged at a distance from the drain electrode and the source electrode. One end and the other end of the antistatic pattern are coupled to the common electrode.

3 Claims, 9 Drawing Sheets

LIQUID CRYSTAL DISPLAY DEVICE

CROSS-REFERENCE TO RELATED APPLICATION

The present application claims priority from Japanese application JP2011-221255 filed on Oct. 5, 2011, the contents of which are hereby incorporated by reference into this application.

BACKGROUND OF THE INVENTION

1. Field of the Invention

The present invention relates to a liquid crystal display device, and more particularly to a technique of suppressing the deterioration of a display quality.

2. Description of the Related Art

Up to now, liquid crystal display devices have been known in which a planar common electrode is formed on a passivation layer formed on a source electrode and a drain electrode configuring a TFT (thin film transistor), an interlayer insulating film is formed on the common electrode, and a pixel electrode is formed on the interlayer insulating film (refer to JP 2010-181785 A).

A back channel region to be described later is present in an upper portion of a semiconductor layer (amorphous silicon layer (a-si layer)) which is located between the source electrode and the drain electrode, and formed on a gate electrode.

Hereinafter, a description will be given of a configuration of a TFT array in which a columnar spacer is arranged on each TFT with reference to FIGS. 8 and 9.

FIG. 8 is a plan view illustrating a main portion of a pixel in a conventional liquid crystal display device 100. FIG. 9 is a cross-sectional view taken along a line IX-IX' of FIG. 8. In FIGS. 8 and 9, X, Y, and Z represent an X-axis, a Y-axis, and a Z-axis, respectively.

As illustrated in FIG. 9, a TFT array 101 includes a gate electrode 112, a gate insulating film 111, a semiconductor layer 109, a drain electrode 107, a source electrode 108, a passivation layer 103, and a common electrode 102.

The gate electrode 112 is formed on an insulating substrate not shown. The gate insulating film 111 is so formed as to cover the gate electrode 112.

The semiconductor layer 109 is formed on the gate insulating film 111, and at a position facing the gate electrode 112. The semiconductor layer 109 forms a back channel region 113 (hereinafter referred to simply as "channel region") of the TFT, and, for example, is formed through a plasma CVD technique.

The drain electrode 107 and the source electrode 108 are formed on the semiconductor layer 109 so as to sandwich the channel region 113 therebetween.

In this case, as illustrated in FIG. 8, the drain electrode 107 is coupled to a video signal line (drain line) 104 extending in a Y-direction of FIG. 8. A video signal (gradation signal) from a driver circuit not shown is supplied to the video signal line 104. The source electrode 108 is coupled to a pixel electrode 117 (refer to FIG. 8).

Also, the gate electrode 112 is coupled to a scanning signal line (gate line) 105 extending in an X-direction of FIG. 8. A scanning signal is supplied from the driver circuit to the scanning signal line 105.

As illustrated in FIG. 8, a unit pixel is configured by a region surrounded by two adjacent video signal lines 104 and two adjacent scanning signal lines 105. A plurality of the unit pixels are arranged in a matrix along the video signal lines 104 and the scanning signal lines 105.

As illustrated in FIG. 9, the passivation layer 103 is formed above the drain electrode 107 and the source electrode 108 so as to cover the TFT constituted by the gate electrode 112, the drain electrode 107, and the source electrode 108.

The common electrode 102 is formed on the passivation layer 103 in a region except for an opening portion 114 which will be described later. In this case, the opening portion 114 has a region (which is a square region in this embodiment) surrounded by a boundary line indicated by reference numeral 106 of FIG. 8. The opening region is a region wider than at least the channel region 113 (refer to FIG. 9), which is provided for the purpose of preventing the back channel effect as will hereinafter be described.

A columnar spacer 110 for ensuring a region in which liquid crystal not shown is to be sealed is arranged above the channel region 113.

Incidentally, the back channel effect means that when a small back gate voltage is applied to the gate electrode 112 in a state where the TFT is off, a leakage current is allowed to flow into the drain electrode 107 and the source electrode 108 through the channel region 113.

A case in which the back gate voltage is developed in the state where the TFT is off is, for example, when positively charged impurity ions are put on the TFT. When the back channel effect occurs in the state where the TFT is off, electric charge held on the TFT used in each pixel of an LCD panel disappears, and so-called "whiting" occurs, resulting in such a problem that the display quality of the liquid crystal display device is deteriorated.

Under the circumstances, in order to prevent the back channel effect, the opening portion 114 is formed in a region corresponding to the channel region 113 within the region where the common electrode 102 is formed. The opening portion 114 is formed, and the impurity ions existing on the TFT are escaped from the opening portion 114, thereby making it possible to suppress the occurrence of the above-mentioned back gate voltage.

Incidentally, when an impact is exerted on the liquid crystal display panel from the external of the liquid crystal display device 100, the impact (force F in FIG. 9) is also transmitted to the columnar spacer 110. For example, when the impact is exerted in a direction perpendicular to the liquid crystal display panel (in a thickness direction of the TFT array 101 (hereinafter called "TFT thickness direction") from the external of the liquid crystal display device 100, the force F acts on the columnar spacer 110 in the TFT thickness direction.

When the force F acts on the columnar spacer 110 in the TFT thickness direction, the columnar spacer 110 collides with the passivation layer 103. When the columnar spacer 110 collides with the passivation layer 103, a static electricity 115 occurs above the channel region 113.

Because the transistor characteristic of the TFT fluctuates due to the static electricity 115, color unevenness, smear, or misadjusted black level occurs in a display image of the liquid crystal display device 100. This leads to such a problem that the display quality of the liquid crystal display device 100 is deteriorated.

SUMMARY OF THE INVENTION

The present invention has been made in view of the above circumstances, and aims at providing a liquid crystal display device that can suppress the deterioration of a display quality.

According to a first aspect of the present invention, there is provided a liquid crystal display device including: a gate electrode formed on an upper surface of an insulating substrate; a gate insulating film laminated to cover the gate electrode, a source electrode and a drain electrode formed above the gate insulating film; a semiconductor layer that is laminated on an upper surface of the gate insulating film, and controls a current between the source electrode and the drain electrode by an electric field developed by the gate electrode; a common electrode that has an opening portion formed in a region corresponding to a channel region above the semiconductor layer; and a conductive pattern arranged at a distance from the source electrode and the drain electrode, in which one end and the other end of the conductive pattern are coupled to the common electrode.

According to a second aspect of the present invention, there is provided a liquid crystal display device including: a gate electrode that is formed on an upper surface of an insulating substrate; a gate insulating film that is laminated to cover the gate electrode; a source electrode and a drain electrode that are formed above the gate insulating film; and a semiconductor layer that is laminated on an upper surface of the gate insulating film, in which the gate electrode can be escaped to a common electrode through the conductive pattern.

Accordingly, the fluctuation of the transistor characteristic of the TFT caused by the static electricity can be suppressed. For that reason, since color unevenness, smear, and misadjusted black level of the display image in the liquid crystal display device can be suppressed, as a result of which the deterioration of the display quality of the liquid crystal display device can be suppressed.

The other advantages of the present invention will become apparent from the description of the entire specification.

DETAILED DESCRIPTION OF THE INVENTION

Figure 1:
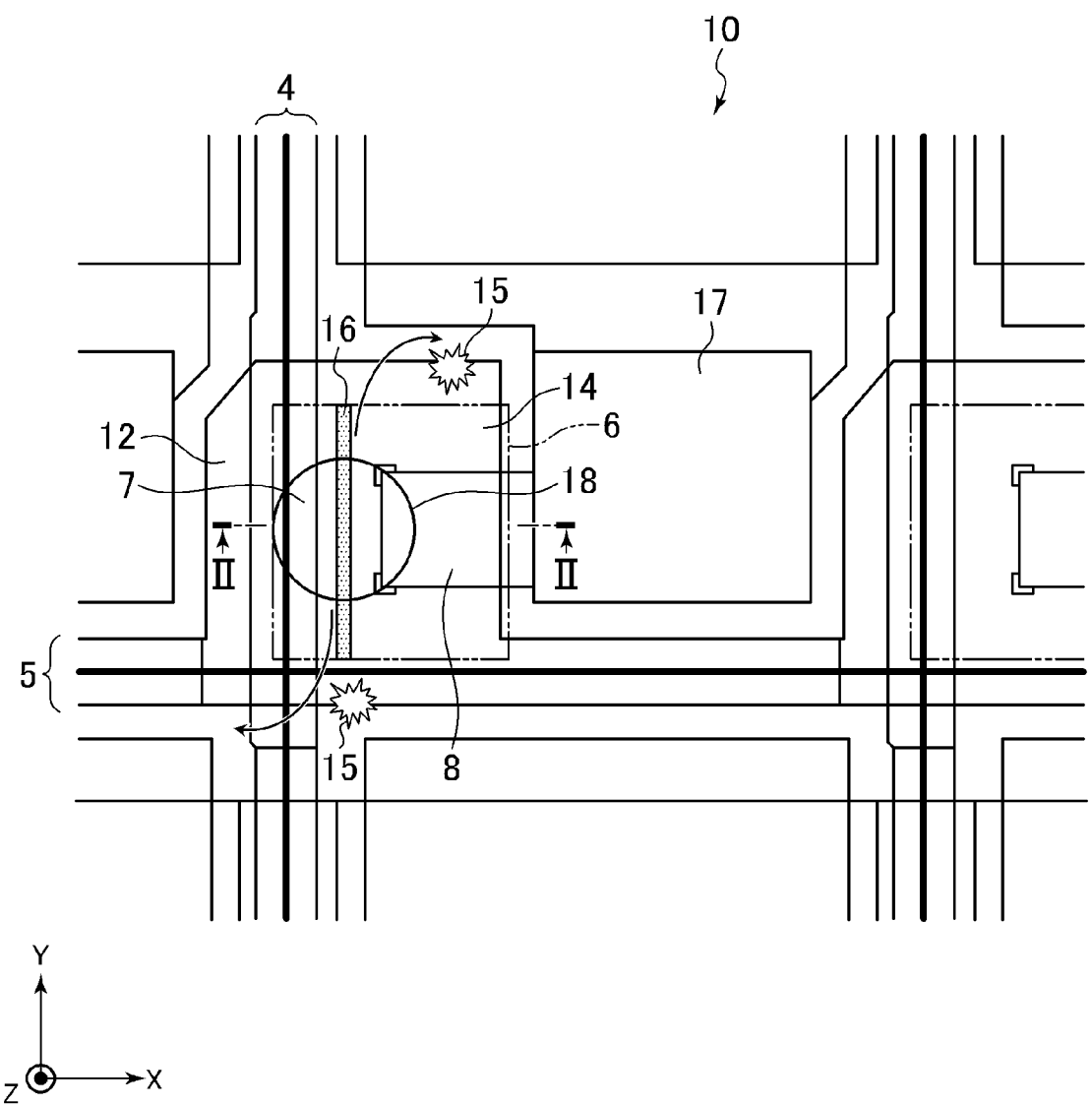
FIG. 1 is a plan view illustrating a main portion of a pixel in a liquid crystal display device according to a first embodiment.
Figure 2:
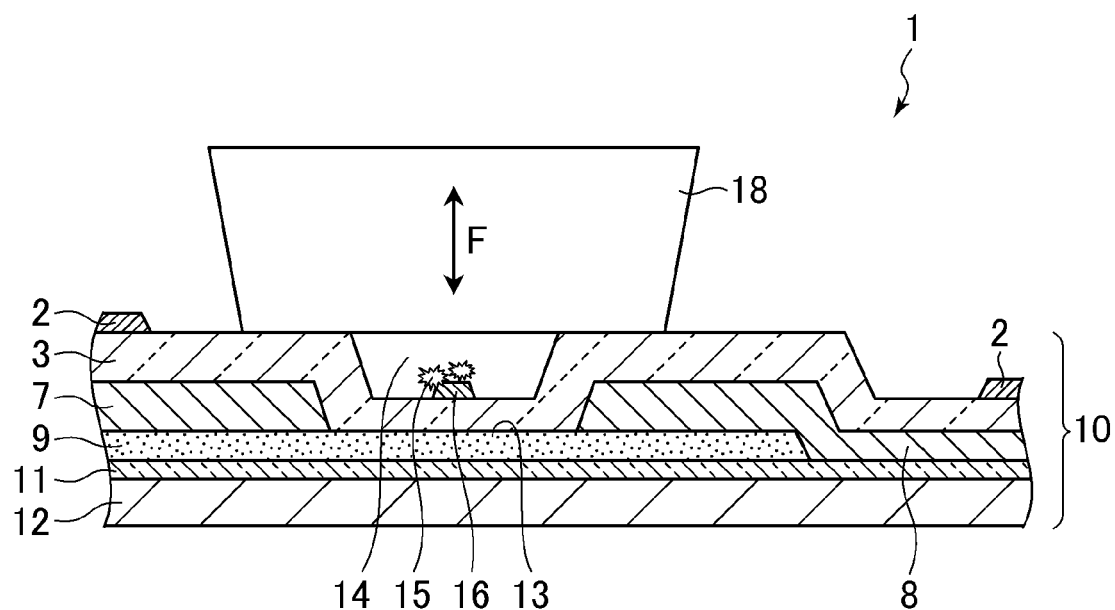
FIG. 2 is a cross-sectional view taken along a line II-II in FIG. 1.

Hereinafter, embodiments of the present invention will be described with reference to the drawing.
[First Embodiment]
Hereinafter, a description will be given of a configuration of a liquid crystal display device 1 according to a first embodiment with reference to FIGS. 1 and 2. FIG. 1 is a plan view illustrating a main portion of a pixel in the liquid crystal display device according to the first embodiment. FIG. 2 is a cross-sectional view taken along a line II-II in FIG. 1. In FIGS. 1 and 2, X, Y, and Z represent an X-axis, a Y-axis, and a Z-axis, respectively.

As illustrated in FIG. 2, a TFT array 10 includes a gate electrode 12, a gate insulating film 11, a semiconductor layer 9, a drain electrode 7, a source electrode 8, a passivation layer 3, a common electrode 2, and an antistatic pattern (conductive layer) 16 made of metal having a conductive property.

The gate electrode 12 is formed on an insulating substrate made of glass not shown. The gate electrode 12 is formed in the same layer as that of a scanning signal line 5 which will be described later.

The gate insulating film 11 is formed of, for example, an Si nitride film, and formed to cover the gate electrode 12.

The semiconductor layer 9 is formed of, for example, an a-si (amorphous silicon) film, and formed on an upper surface of the gate insulating film 11 at a position facing the gate electrode 12.

The drain electrode 7 and the source electrode 8 are formed on the semiconductor layer 9 so as to sandwich a back channel region (hereinafter called "channel region") 13 formed on an upper portion of the semiconductor layer 9 therebetween. The source electrode 8 is coupled to a pixel electrode 17.

An n$^+$Si layer not shown is formed between the semiconductor layer 9 and the drain electrode 7, and the n$^+$Si layer is also formed between the semiconductor layer 9 and the source electrode 8. This is made to obtain an ohmic contact between the semiconductor layer 9 and the drain electrode 7, and also to obtain an ohmic contact between the semiconductor layer 9 and the source electrode 8.

In this example, as illustrated in FIG. 1, the drain electrode 7 is formed of a part of a video signal line (drain line) 4 extending in a Y-direction in FIG. 1. A video signal (gradation signal) from a driver circuit not shown is supplied to the video signal line 4.

Also, the gate electrode 12 is coupled to the scanning signal line (gate line) 5 extending in an X-direction in FIG. 1. A scanning signal is supplied to the scanning signal line 5 from the driver circuit.

In this example, as illustrated in FIG. 1, a unit pixel of a liquid crystal display panel configuring the liquid crystal display device 1 is configured by a region surrounded by two adjacent video signal lines 4 and two adjacent scanning signal lines 5. A plurality of the unit pixels are arranged in a matrix along the video signal lines 4 and the scanning signal lines 5.

Returning to FIG. 2, the passivation layer 3 is formed on upper surfaces of the drain electrode 7 and the source electrode 8 so as to cover a TFT configured by the gate electrode 12, the drain electrode 7, and the source electrode 8.

The passivation layer 3 has a function of protecting particularly the channel region 13 of the TFT from impurities, and provides an inorganic passivation film and an organic passivation film not shown. More specifically, the organic passivation film is formed on the inorganic passivation film. The organic passivation film also functions to flatten a surface of the TFT together with the protection of the TFT. The passivation layer 3 has a recess concaved between the source electrode 8 and the drain electrode 7. The antistatic pattern 16 is formed to pass through a bottom of the recess.

The common electrode 2 is formed in a planar shape on the passivation layer 3 and in a region (hereinafter called "common region") except for an opening portion 14 which will be described later. The common electrode 2 is formed by sputtering an ITO (indium tin oxide) which is a transparent conductive film in the common region. The opening portion 14 is formed by etching an opening region which will be described later after the common electrode 2 has been formed into the planar shape.

In this example, the opening portion 14 has a region (which is a square region in this embodiment) surrounded by a boundary line (two-dot chain line) indicated by reference numeral 6 in FIG. 1. The opening region is a region wider than at least the channel region 13 (refer to FIG. 2), which is provided for the purpose of preventing the above-mentioned back channel effect.

In the opening portion 14, the antistatic pattern 16 is formed at a distance from the drain electrode 7 and the source electrode 8. One end and the other end of the antistatic pattern 16 are coupled to the common electrode 2. The antistatic pattern 16 is formed on an upper surface of the above-mentioned passivation layer 3, and above the channel region 13, and formed to join opposite sides 6 and 6 of the opening portion 14.

If the one end and the other end of the antistatic pattern 16 are coupled to the common electrode 2, and the antistatic pattern 16 is arranged at a distance from the drain electrode 7 and the source electrode 8, its pattern shape is not limited to the pattern shape illustrated in FIG. 1.

Also, a columnar spacer 18 for ensuring a region for sealing liquid crystal not shown therein is arranged above the channel region 13. The columnar spacer 18 is arranged above the channel region 13. The columnar spacer 18 comes out of contact with the antistatic pattern 16 above the recess of the passivation layer 3. The columnar spacer 18 comes in contact with the passivation layer 3. The columnar spacer 18 comes in contact with the passivation layer 3 (specifically, a peripheral portion of the recess). The columnar spacer 18 comes out of contact with the antistatic pattern 16 above the recess.

A reference voltage is applied to the common electrode 2 formed as described above, and a voltage derived from the video signal is applied to the pixel electrode 17 through the source electrode 8.

When the voltage derived from the video signal is applied to the pixel electrode 17, electric force lines occur, and liquid crystal molecules not shown rotate in a direction of the electric force lines. Thus, the liquid crystal molecules are rotated in the direction of the electric force lines to control the amount of transmission of light (backlight light) from a backlight not shown. This control is conducted for each unit pixel.

In the liquid crystal display device 1 according to the first embodiment, the opening portion 14 is provided above at least the channel region 13. As a result, even when a back gate voltage is applied to the gate electrode 12 in a state where the TFT is off, a leakage current flowing in the drain electrode 7 and the source electrode 8 through the channel region 13 can be suppressed.

Also, for example, when an impact is exerted in a direction (thickness direction of the TFT array 10 (Z-axis direction in FIG. 1), hereinafter called "TFT thickness direction") perpendicular to a width direction (X-axis direction in FIG. 1) of the liquid crystal display panel from the external of the liquid crystal display device 1, a force F acts on the columnar spacer 18 in the TFT thickness direction. When the columnar spacer 18 collides with the passivation layer 3, a static electricity 15 occurs above the channel region 13.

However, according to the first embodiment, since the antistatic pattern 16 is formed above the channel region, the static electricity that has occurred above the channel region can be escaped to the common electrode 2 through the antistatic pattern 16.

Accordingly, the fluctuation of transistor characteristics of the TFT caused by the static electricity 15 can be suppressed.

For that reason, since the occurrence of color unevenness, smear, or misadjusted black level in a display image of the liquid crystal display device 1 can be suppressed, the deterioration of the display quality of the liquid crystal display device 1 can be resultantly suppressed.

[Second Embodiment]

Figure 3:
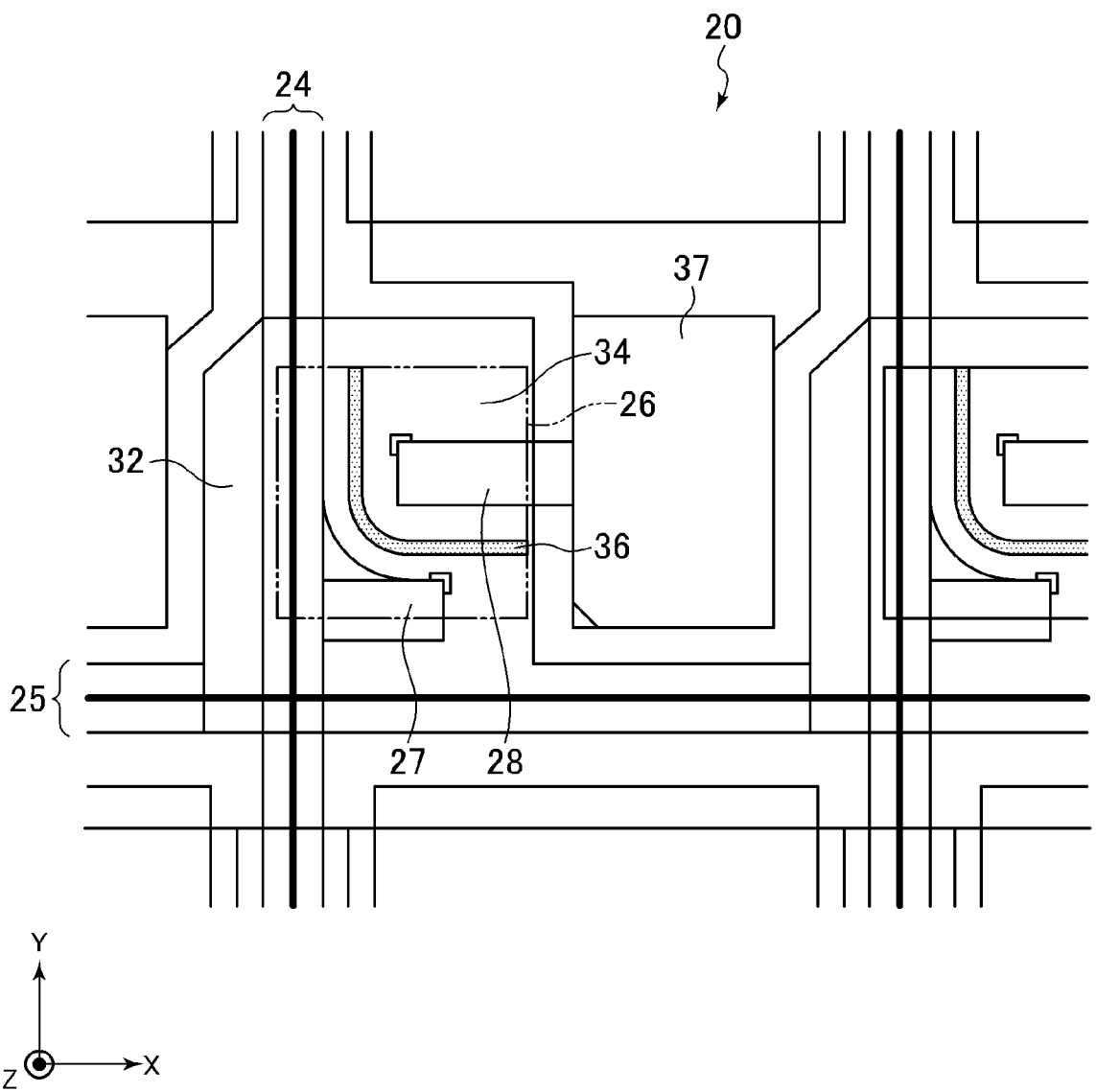
FIG. 3 is a plan view illustrating a main portion of a pixel in a liquid crystal display device according to a second embodiment.

Hereinafter, a description will be given of a configuration of a liquid crystal display device 20 according to a second embodiment with reference to FIG. 3. FIG. 3 is a plan view illustrating a main portion of a pixel in the liquid crystal display device according to the second embodiment. The liquid crystal display device 20 according to the second embodiment is substantially identical with the TFT array 10 of the liquid crystal display device 1 according to the first embodiment, except for the shapes of a drain electrode 27, a source electrode 28, and an antistatic pattern 36 made of a metal having a conductive property. Therefore, different configurations will be mainly described below.

As illustrated in FIG. 3, a gate electrode 32 is formed on an upper surface of an insulating substrate made of glass not shown. The gate electrode 32 is coupled to a scanning signal line 25 extending in the X-direction in FIG. 3.

The drain electrode 27 of a rectangular shape is coupled to a video signal line 24, and extends in a direction (X-direction in FIG. 3) orthogonal to a longitudinal direction of the video signal line 24. The source electrode 28 of a rectangular shape is arranged in parallel to an extension direction of the drain electrode 27 and at a given distance from the drain electrode 27. Also, a pixel electrode 37 is coupled to the source electrode 28.

In this example, as illustrated in FIG. 3, a unit pixel of a liquid crystal display panel configuring the liquid crystal display device 20 is configured by a region surrounded by two adjacent video signal lines 24 and two adjacent scanning signal lines 25. A plurality of the unit pixels are arranged in a matrix along the video signal lines 24 and the scanning signal lines 25.

A passivation layer not shown is formed on upper surfaces of the drain electrode 27 and the source electrode 28 so as to cover a TFT configured by the gate electrode 32, the drain electrode 27, and the source electrode 28.

A common electrode is formed in a planar shape on the passivation layer and in a region (hereinafter called "common region") except for an opening portion 34 which will be described later. The opening portion 34 is formed by etching the common electrode that has been formed in the planar shape.

The opening portion 34 has a region (which is a rectangular region in this embodiment) surrounded by a boundary line (two-dot chain line) indicated by reference numeral 26 in FIG. 1. The opening region is a region wider than a channel region (refer to FIG. 2) above at least the gate electrode 32. The opening portion 34 has the function of preventing the back channel effect as in the first embodiment.

In the opening portion 34, the antistatic pattern 36 is formed at a distance from the drain electrode 27 and the source electrode 28. One end and the other end of the antistatic pattern 36 are coupled to the common electrode. The antistatic pattern 36 is formed on an upper surface of the above-mentioned passivation layer, and above the channel region. The antistatic pattern 36 is formed to join opposite sides of the opening portion 34.

If the one end and the other end of the antistatic pattern 36 are coupled to the common electrode, and the antistatic pattern 36 is arranged at a distance from the drain electrode 27 and the source electrode 28, its pattern shape is not limited to the pattern shape illustrated in FIG. 3.

Also, a columnar spacer (not shown) for ensuring a region for sealing liquid crystal therein is arranged above the channel region.

A reference voltage is applied to the common electrode formed as described above, and a voltage derived from the video signal is applied to the pixel electrode 37 through the source electrode 28.

When the voltage is applied to the pixel electrode 37, electric force lines occur, and liquid crystal molecules not shown rotate in a direction of the electric force lines. Thus, the liquid crystal molecules are rotated in the direction of the electric force lines to control the amount of transmission of light from a backlight not shown. This control is conducted for each unit pixel. Since the above-mentioned operation is identical with that in third, fourth, and fifth embodiments which will be described later, the description of the above-mentioned operation in the third, fourth, and fifth embodiments will be omitted.

In the liquid crystal display device 20 according to the second embodiment, the opening portion 34 is provided in the region corresponding to at least the channel region. As a result, even when a back gate voltage is applied to the gate electrode 32 in a state where the TFT is off, a leakage current flowing in the drain electrode 27 and the source electrode 28 through the channel region (refer to FIG. 2) can be suppressed.

Also, for example, even if an impact is exerted in a Z-axis direction in FIG. 3 from the external of the liquid crystal display device 20, since the antistatic pattern 36 is formed above the channel region, the static electricity developed above the channel region (refer to FIG. 2) can be escaped to the common electrode through the antistatic pattern 36.

Accordingly, the fluctuation of transistor characteristics of the TFT caused by the static electricity can be suppressed. For that reason, since the occurrence of color unevenness, smear, or misadjusted black level in a display image of the liquid crystal display device 20 can be suppressed, the deterioration of the display quality of the liquid crystal display device 20 can be resultantly suppressed.

[Third Embodiment]

Figure 4:
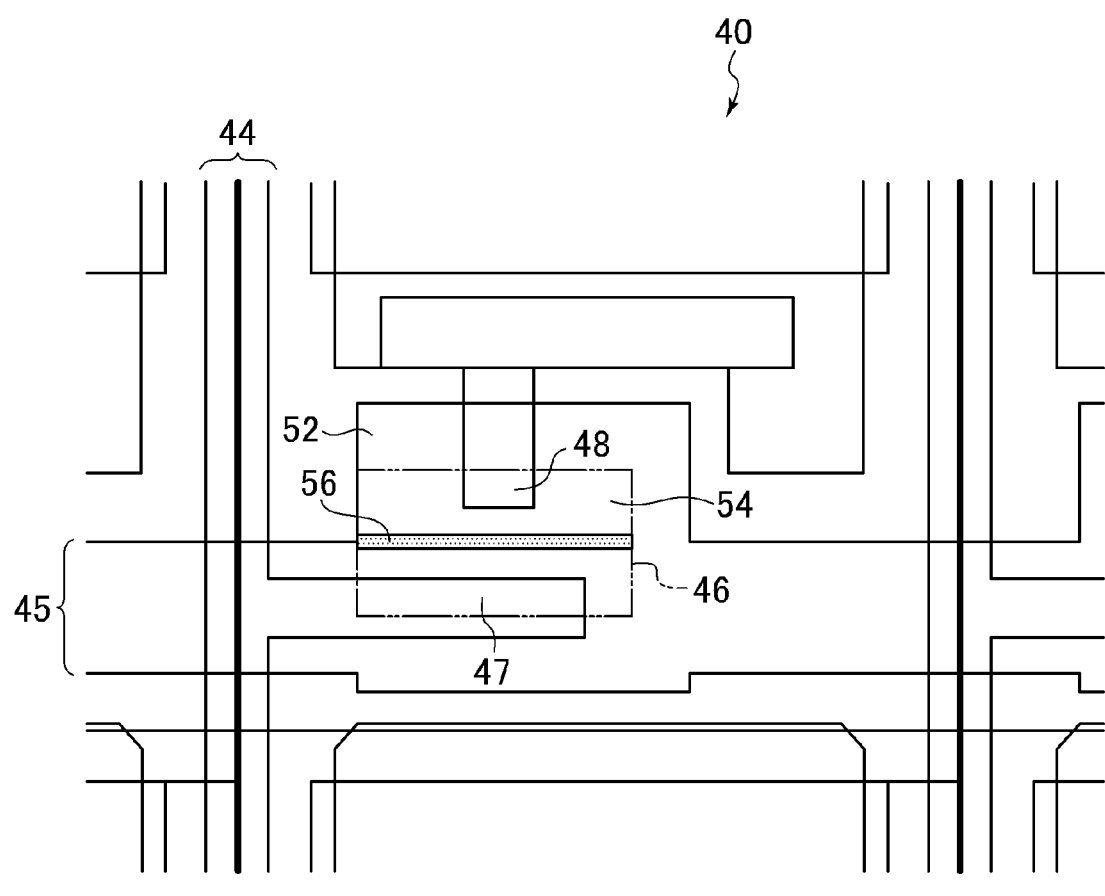
FIG. 4 is a plan view illustrating a main portion of a pixel in a liquid crystal display device according to a third embodiment.

Hereinafter, a description will be given of a configuration of a liquid crystal display device 40 according to a third embodiment with reference to FIG. 4. FIG. 4 is a plan view illustrating a main portion of a pixel in the liquid crystal display device according to the third embodiment. The liquid crystal display device 40 according to the third embodiment is substantially identical with the TFT array 10 of the liquid crystal display device 1 according to the first embodiment, except for the shapes of a drain electrode 47, a source electrode 48, and an antistatic pattern 56 made of a metal having a conductive property. Therefore, different configurations will be mainly described below.

As illustrated in FIG. 4, a gate electrode 52 is formed on an upper surface of an insulating substrate made of glass not shown.

The gate electrode 52 is coupled to a scanning signal line 45 extending in the X-direction in FIG. 4.

The drain electrode 47 of a rectangular shape is coupled to a video signal line 44, and extends in a direction (X-direction in FIG. 4) orthogonal to a longitudinal direction of the video signal line 44. The source electrode 48 of a rectangular shape is arranged in a direction (Y-direction in FIG. 4) orthogonal to an extension direction of the drain electrode 47 and at a given distance from the drain electrode 47.

In this example, as illustrated in FIG. 4, a unit pixel of a liquid crystal display panel configuring the liquid crystal display device 40 is configured by a region surrounded by two adjacent video signal lines 44 and two adjacent scanning signal lines 45. A plurality of the unit pixels are arranged in a matrix along the video signal lines 44 and the scanning signal lines 45.

A passivation layer not shown is formed on upper surfaces of the drain electrode 47 and the source electrode 48 so as to cover a TFT configured by the gate electrode 52, the drain electrode 47, and the source electrode 48.

A common electrode is formed in a planar shape on the passivation layer and in a region (hereinafter called "common region") except for an opening portion 54 which will be described later. The opening portion 54 is formed by etching the common electrode that has been formed in the planar shape.

In this example, the opening portion 54 has a region (which is a square region in this embodiment) surrounded by a boundary line (two-dot chain line) indicated by reference numeral 46 in FIG. 4. The opening region is a region wider than a channel region (refer to FIG. 2) above at least the gate electrode 52. The opening portion 54 has the function of preventing the back channel effect as in the first embodiment.

In the opening portion 54, the antistatic pattern 56 is formed at a distance from the drain electrode 47 and the source electrode 48. One end and the other end of the antistatic pattern 56 are coupled to the above-mentioned common electrode. The antistatic pattern 56 is formed on an upper surface of the above-mentioned passivation layer above the channel region (refer to FIG. 2).

If the one end and the other end of the antistatic pattern 56 are coupled to the common electrode, and the antistatic pattern 56 is arranged at a distance from the drain electrode 47 and the source electrode 48, its pattern shape is not limited to the pattern shape illustrated in FIG. 4.

Also, a columnar spacer (refer to FIG. 2) for ensuring a region for sealing liquid crystal therein is arranged above the channel region (refer to FIG. 2) of the TFT.

In the liquid crystal display device 40 according to the third embodiment, the opening portion 34 is provided in the region corresponding to at least the channel region. As a result, even when a back gate voltage is applied to the gate electrode 52 in a state where the TFT is off, a leakage current flowing in the drain electrode 47 and the source electrode 48 through the channel region (refer to FIG. 2) can be suppressed.

Also, for example, even if an impact is exerted in the Z-axis direction in FIG. 4 from the external of the liquid crystal display device 40, since the antistatic pattern 56 is formed above the channel region, a static electricity developed above the channel region (refer to FIG. 2) can be escaped to the common electrode through the antistatic pattern 56.

Accordingly, the fluctuation of transistor characteristics of the TFT caused by the static electricity can be suppressed. For that reason, since the occurrence of color unevenness, smear, or misadjusted black level in a display image of the liquid crystal display device 40 can be suppressed, the deterioration of the display quality of the liquid crystal display device 40 can be resultantly suppressed.

[Fourth Embodiment]

Figure 5:
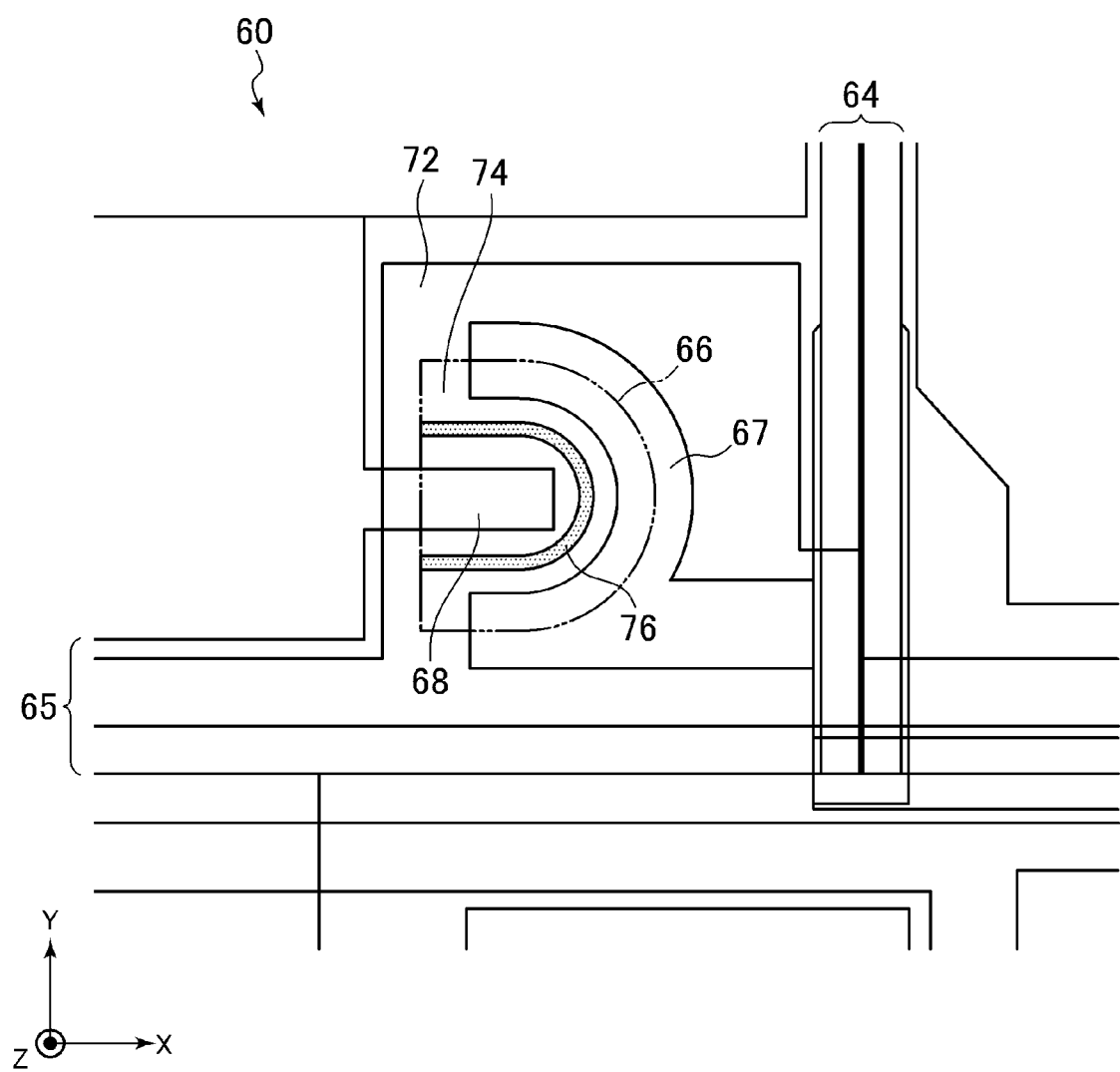
FIG. 5 is a plan view illustrating a main portion of a pixel in a liquid crystal display device according to a fourth embodiment.

Hereinafter, a description will be given of a configuration of a liquid crystal display device 60 according to a fourth embodiment with reference to FIG. 5. FIG. 5 is a plan view illustrating a main portion of a pixel in the liquid crystal display device according to the fourth embodiment. The liquid crystal display device 60 according to the fourth embodiment is substantially identical with the TFT array 10 of the liquid crystal display device 1 according to the first embodiment, except for the shapes of a drain electrode 67, a source electrode 68, and an antistatic pattern 76 made of a metal having a conductive property. Therefore, different configurations will be mainly described below.

As illustrated in FIG. 5, a gate electrode 72 is formed on an upper surface of an insulating substrate made of glass not shown. The gate electrode 72 is coupled to a scanning signal line 65 extending in the X-direction in FIG. 5.

The drain electrode 67 which is substantially U-shaped is coupled to a video signal line 64.

The source electrode 68 of a rectangular shape is arranged between both ends of the drain electrode 67 which is substantially U-shaped, at a given distance from the drain electrode 67.

In this example, as illustrated in FIG. 5, a unit pixel of a liquid crystal display panel configuring the liquid crystal display device 60 is configured by a region surrounded by two adjacent video signal lines 64 and two adjacent scanning signal lines 65. A plurality of the unit pixels are arranged in a matrix along the video signal lines 64 and the scanning signal lines 65.

A passivation layer not shown is formed on upper surfaces of the drain electrode 67 and the source electrode 68 so as to cover a TFT configured by the gate electrode 72, the drain electrode 67, and the source electrode 68.

A common electrode is formed in a planar shape on the passivation layer and in a region (hereinafter called "common region") except for an opening portion 74 which will be described later. The opening portion 74 is formed by etching the common electrode that has been formed in the planar shape.

In this example, the opening portion 74 has a region (which is a D-shaped square in this embodiment) surrounded by a boundary line indicated by reference numeral 66 in FIG. 5. The opening region is a region wider than a channel region (refer to FIG. 2) above at least the gate electrode 72. The opening portion 74 has the function of preventing the back channel effect as in the first embodiment.

In the opening portion 74, the antistatic pattern 76 is formed at a distance from the drain electrode 67 and the source electrode 68. One end and the other end of the antistatic pattern 76 are coupled to the above-mentioned common electrode. The antistatic pattern 76 is formed on the above-mentioned passivation layer, above the channel region (refer to FIG. 2). The antistatic pattern 76 is formed to extend from one side of the opening portion 74 and return to the same side.

If the one end and the other end of the antistatic pattern 76 are coupled to the common electrode, and the antistatic pattern 76 is arranged at a distance from the drain electrode 67 and the source electrode 68, its pattern shape is not limited to the pattern shape illustrated in FIG. 5.

Also, a columnar spacer (refer to FIG. 2) for ensuring a region for sealing liquid crystal therein is arranged above the channel region (refer to FIG. 2) of the TFT.

In the liquid crystal display device 60 according to the fourth embodiment, the opening portion 74 is provided in the region corresponding to at least the channel region. As a result, even when a back gate voltage is applied to the gate electrode 72 in a state where the TFT is off, a leakage current flowing in the drain electrode 67 and the source electrode 68 through the channel region (refer to FIG. 2) can be suppressed.

Also, for example, even if an impact is exerted in the Z-axis direction in FIG. 5 from the external of the liquid crystal display device 60, since the antistatic pattern 76 is formed above the channel region, a static electricity developed above the channel region (refer to FIG. 2) can be escaped to the common electrode through the antistatic pattern 76.

Accordingly, the fluctuation of transistor characteristics of the TFT caused by the static electricity can be suppressed. For that reason, since the occurrence of color unevenness, smear, or misadjusted black level in a display image of the liquid crystal display device 60 can be suppressed, the deterioration of the display quality of the liquid crystal display device 60 can be resultantly suppressed.

[Fifth Embodiment]

Figure 6:
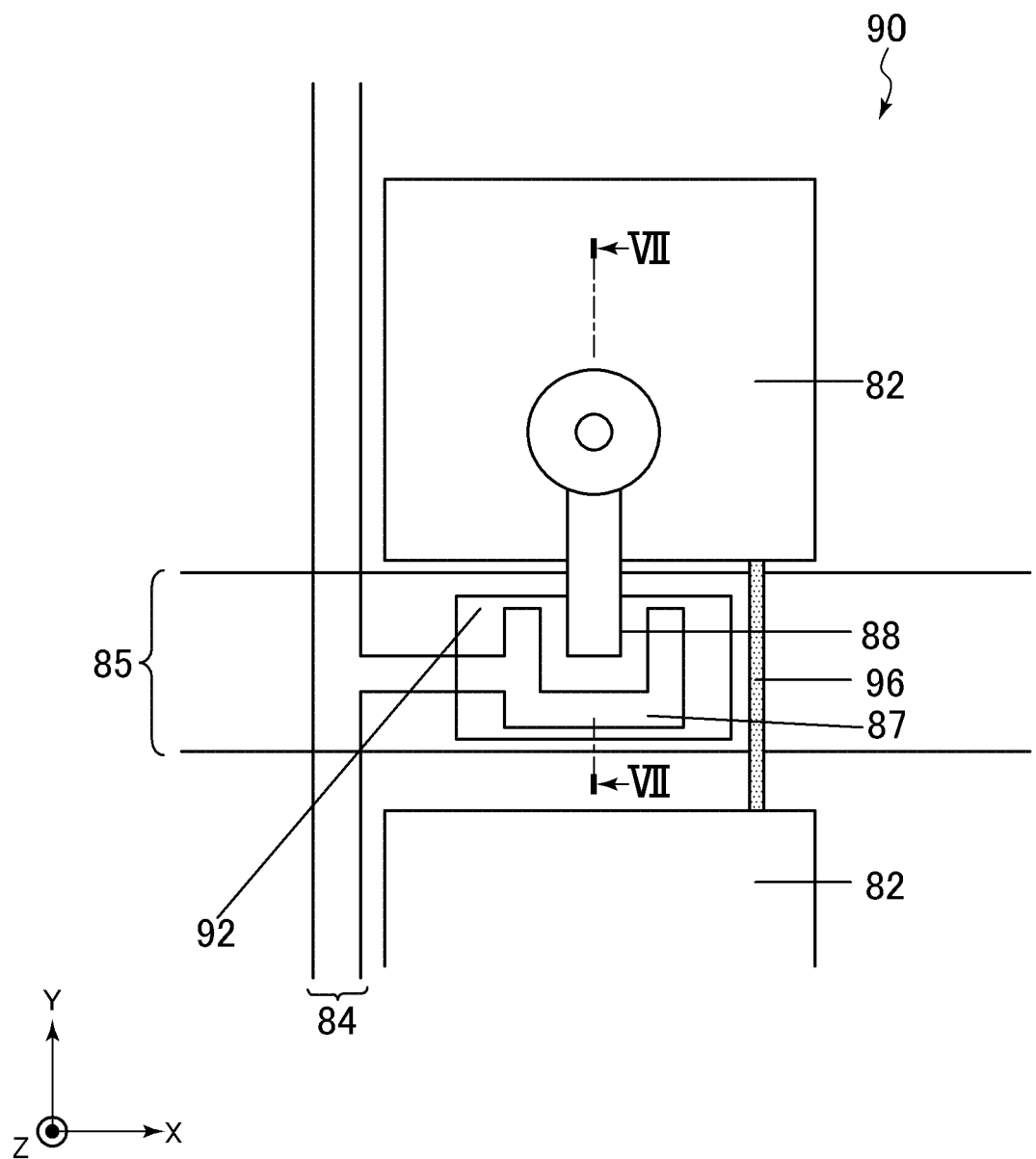
FIG. 6 is a plan view illustrating a main portion of a pixel in a liquid crystal display device according to a fifth embodiment.
Figure 7:
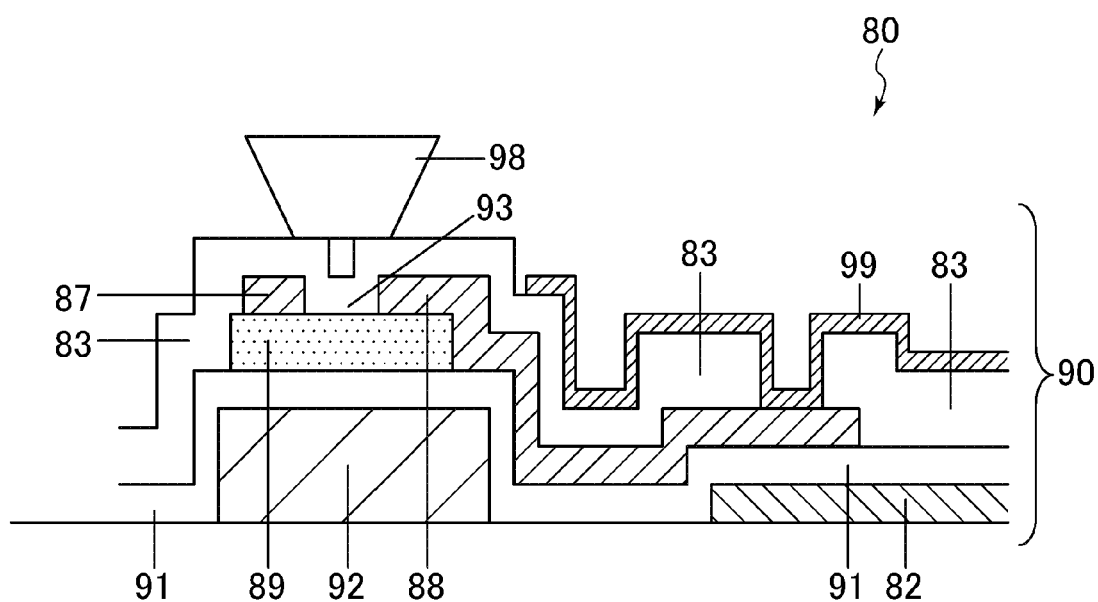
FIG. 7 is a cross-sectional view taken along a line VII-VII in FIG. 6.
Figure 8:
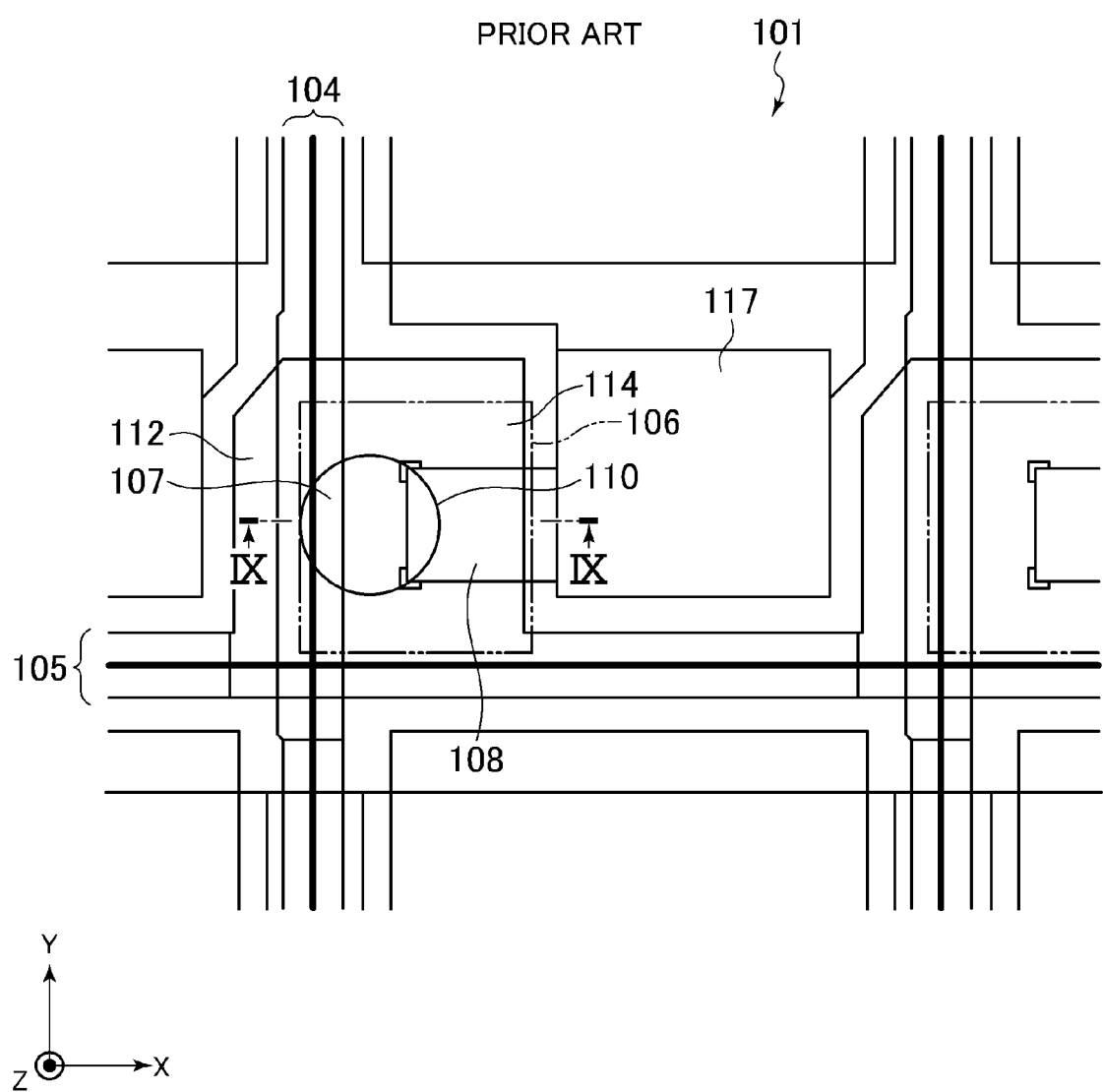
FIG. 8 is a plan view illustrating a main portion of a pixel in a related-art liquid crystal display device.
Figure 9:
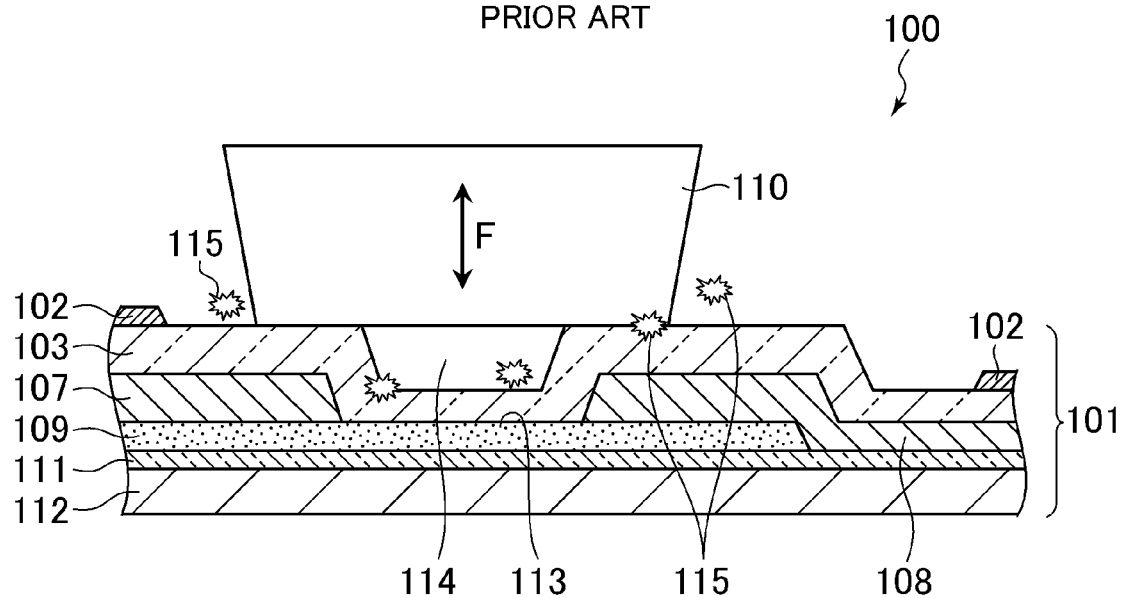
FIG. 9 is a cross-sectional view taken along a line IX-IX in FIG. 8.

Hereinafter, a description will be given of a configuration of a liquid crystal display device 80 according to a fifth embodiment with reference to FIGS. 6 and 7. FIG. 6 is a plan view illustrating a main portion of a pixel in the liquid crystal display device according to the fifth embodiment. FIG. 7 is a cross-sectional view taken along a line VII-VII of FIG. 6. In FIGS. 6 and 7, X, Y, and Z represent an X-axis, a Y-axis, and a Z-axis, respectively.

As illustrated in FIG. 7 a TFT array 90 includes a gate electrode 92, a gate insulating film 91, a semiconductor layer 89, a drain electrode 87, a source electrode 88, a passivation layer 83, a common electrode 82, and an antistatic pattern (conductive layer) 96 (refer to FIG. 6) made of metal having a conductive property.

The gate electrode 92 is formed on a TFT substrate made of glass not shown. The gate electrode 92 is formed in the same layer as that of a scanning signal line (gate line) 85 which will be described later.

The common electrode 82 is formed of an ITO which is a transparent conductive film, and formed in the same layer as that of the gate electrode 92.

The gate insulating film 91 is formed of, for example, an Si nitride film, and formed to cover the gate electrode 92 and the common electrode 82. The semiconductor layer 89 is formed of, for example, an a-si (amorphous silicon) film, and formed on the gate insulating film 91 at a position facing the gate electrode 92.

The drain electrode 87 and the source electrode 88 are formed on the semiconductor layer 89 so as to sandwich a back channel region (hereinafter called "channel region") 93 therebetween.

In this example, as illustrated in FIG. 6, the drain electrode 87 is coupled to a video signal line (drain line) 84 extending in the Y-direction in FIG. 6. A video signal (gradation signal) from a driver circuit not shown is supplied to the video signal line 84.

Also, the gate electrode 92 is coupled to the scanning signal line (gate line) 85 extending in the X-direction in FIG. 6. A scanning signal is supplied to the scanning signal line 85 from the driver circuit.

Returning to FIG. 7, the passivation layer 83 is formed on upper surfaces of the drain electrode 87 and the source electrode 88 so as to cover a TFT configured by the gate electrode 92, the drain electrode 87, and the source electrode 88. A source ITO film 99 is formed on the passivation layer 83.

As illustrated in FIG. 6, the antistatic pattern 96 is formed to join the common electrodes 82 and 82 which are so arranged as to sandwich the gate electrode 92 therebetween. That is, one end and the other end of the antistatic pattern 96 are coupled to the common electrodes 82 and 82, respectively, which are so arranged as to sandwich the gate electrode 92 therebetween. However, the antistatic pattern 96 and the gate electrode 92 need to be arranged to come out of contact with each other.

If the one end and the other end of the antistatic pattern 96 are coupled to the common electrodes 82, its pattern shape is not limited to the shape illustrated in FIG. 6.

A columnar spacer 98 (refer to FIG. 7) for ensuring a region for sealing liquid crystal not shown therein is arranged above the channel region 93. The columnar spacer 98 comes in contact with the passivation layer 83.

In this case, for example, when an impact is exerted in a direction (thickness direction of the TFT array 90 (Z-axis direction in FIG. 6), hereinafter called "TFT thickness direction") perpendicular to a width direction (X-axis direction in FIG. 6) of a liquid crystal display panel from the external of the liquid crystal display device 80, a force F acts on the columnar spacer 98 in the TFT thickness direction. When the columnar spacer 98 collides with the passivation layer 83, a static electricity occurs in the vicinity of the channel region 93.

However, according to the fifth embodiment, since the antistatic pattern 96 is formed in the vicinity of the channel region 93, the static electricity that has occurred in the channel region 93 can be escaped to the common electrode 82 through the antistatic pattern 96.

Accordingly, the fluctuation of transistor characteristics of the TFT caused by the static electricity can be suppressed. For that reason, since the occurrence of color unevenness, smear, or misadjusted black level in a display image of the liquid crystal display device 80 can be suppressed, the deterioration of the display quality of the liquid crystal display device 80 can be resultantly suppressed.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
    a gate electrode that is formed on an upper surface of an insulating substrate;
    a gate insulating film that is laminated to cover the gate electrode;
    a source electrode and a drain electrode that are formed above the gate insulating film;
    a semiconductor layer that is laminated on an upper surface of the gate insulating film, and has a channel region in which a current between the source electrode and the drain electrode is controlled by an electric field developed by the gate electrode;
    common electrodes that are formed in the same layer as that of the gate electrode, and arranged at a distance from the gate electrode; and
    a conductive pattern that is arranged next to the channel region of the semiconductor layer above the gate electrode, and coupled to the common electrodes,
    wherein one end and the other end of the conductive pattern are coupled to the common electrodes, respectively, which are so arranged as to sandwich the gate electrode therebetween,
    wherein both of a pixel electrode and the common electrodes are arranged on one side of a liquid crystal layer,
    wherein liquid crystal molecules of the liquid crystal layer rotating in a direction of electric force lines between one of the common electrodes and the pixel electrode occurred by a reference voltage applied to the one of the common electrodes and a voltage derived from a video signal applied to the pixel electrode, and
    wherein static electricity occurred above the channel region is released to the common electrodes through the conductive pattern.

2. The liquid crystal display device according to claim 1, further comprising a columnar spacer that is arranged above the channel region.

3. The liquid crystal display device according to claim 2, further comprising a passivation layer that covers the source electrode and the drain electrode,
    wherein the columnar spacer comes in contact with the passivation layer.

* * * * *